(12) United States Patent
    Seno

(10) Patent No.: US 11,772,327 B2
(45) Date of Patent: Oct. 3, 2023

(54) DEVICE FOR FABRICATING SOLID FREEFORM OBJECT AND METHOD OF FABRICATING SOLID FREEFORM OBJECT

(71) Applicant: Shinya Seno, Kanagawa (JP)

(72) Inventor: Shinya Seno, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/578,321

(22) Filed: Jan. 18, 2022

(65) Prior Publication Data

US 2022/0250317 A1     Aug. 11, 2022

(30) Foreign Application Priority Data

Feb. 10, 2021   (JP) ................. 2021-019693

(51) Int. Cl.
    | | |
    |---|---|
    | *B29C 64/232* | (2017.01) |
    | *B33Y 10/00* | (2015.01) |
    | *B29C 64/124* | (2017.01) |
    | *B29C 64/209* | (2017.01) |
    | *B29C 64/277* | (2017.01) |
    | *B33Y 30/00* | (2015.01) |
    | *B29C 64/245* | (2017.01) |
    | *B29C 64/241* | (2017.01) |
    | *B29C 64/112* | (2017.01) |

(52) U.S. Cl.
    CPC .......... *B29C 64/232* (2017.08); *B29C 64/124* (2017.08); *B29C 64/209* (2017.08); *B29C 64/277* (2017.08); *B33Y 10/00* (2014.12); *B33Y 30/00* (2014.12); *B29C 64/112* (2017.08); *B29C 64/241* (2017.08); *B29C 64/245* (2017.08)

(58) Field of Classification Search
    CPC ... B29C 64/232; B29C 64/124; B29C 64/209; B29C 64/277; B29C 64/112; B29C 64/241; B29C 64/245; B33Y 10/00; B33Y 30/00
    USPC ........................................................ 264/494
    See application file for complete search history.

(56) References Cited

U.S. PATENT DOCUMENTS

| | | |
|---|---|---|
| 2011/0298876 A1 | 12/2011 | Takeuchi et al. |
| 2012/0086762 A1 | 4/2012 | Noguchi et al. |
| | (Continued) | |

FOREIGN PATENT DOCUMENTS

| | | |
|---|---|---|
| JP | 9-216291 | 8/1997 |
| JP | 2015-150708 | 8/2015 |
| | (Continued) | |

*Primary Examiner* — Joseph S Del Sole
*Assistant Examiner* — Lawrence D. Hohenbrink, Jr.
(74) *Attorney, Agent, or Firm* — Duft & Bornsen, PC

(57) ABSTRACT

A device for fabricating a solid freeform object includes a stage that rotates, a discharging device disposed over the stage and includes a discharging head each having one or more nozzles, the discharging head for discharging a curing composition to the stage and an exposing device disposed over the stage that exposes the stage to active energy, wherein the distance between the stage and the discharging device is variable and the distance between the stage and the exposing device is variable, wherein the shorter direction of the discharging head is perpendicular to the direction from the center of rotation of the stage toward the peripheral of the stage, wherein the number of the nozzles along the shorter direction increases in the direction from the center of rotation of the stage toward the peripheral of the stage.

9 Claims, 13 Drawing Sheets

(56) References Cited

U.S. PATENT DOCUMENTS

| | | |
|---|---|---|
| 2012/0114876 A1 | 5/2012 | Kanematsu et al. |
| 2012/0147103 A1 | 6/2012 | Hasegawa et al. |
| 2012/0176456 A1 | 7/2012 | Maekawa et al. |
| 2012/0242768 A1 | 9/2012 | Seno et al. |
| 2013/0065024 A1 | 3/2013 | Aruga et al. |
| 2014/0253631 A1 | 9/2014 | Namba et al. |
| 2015/0091986 A1 | 4/2015 | Seno et al. |
| 2015/0283828 A1 | 10/2015 | Aoai et al. |
| 2016/0257818 A1 | 9/2016 | Mezaki et al. |
| 2018/0111322 A1* | 4/2018 | Mathea ................ B29C 64/176 |
| 2019/0283406 A1 | 9/2019 | Fujita et al. |

FOREIGN PATENT DOCUMENTS

| | | |
|---|---|---|
| JP | 2017-213834 | 12/2017 |
| JP | 2019-217786 | 12/2019 |
| WO | WO2016/009426 A1 | 1/2016 |

\* cited by examiner

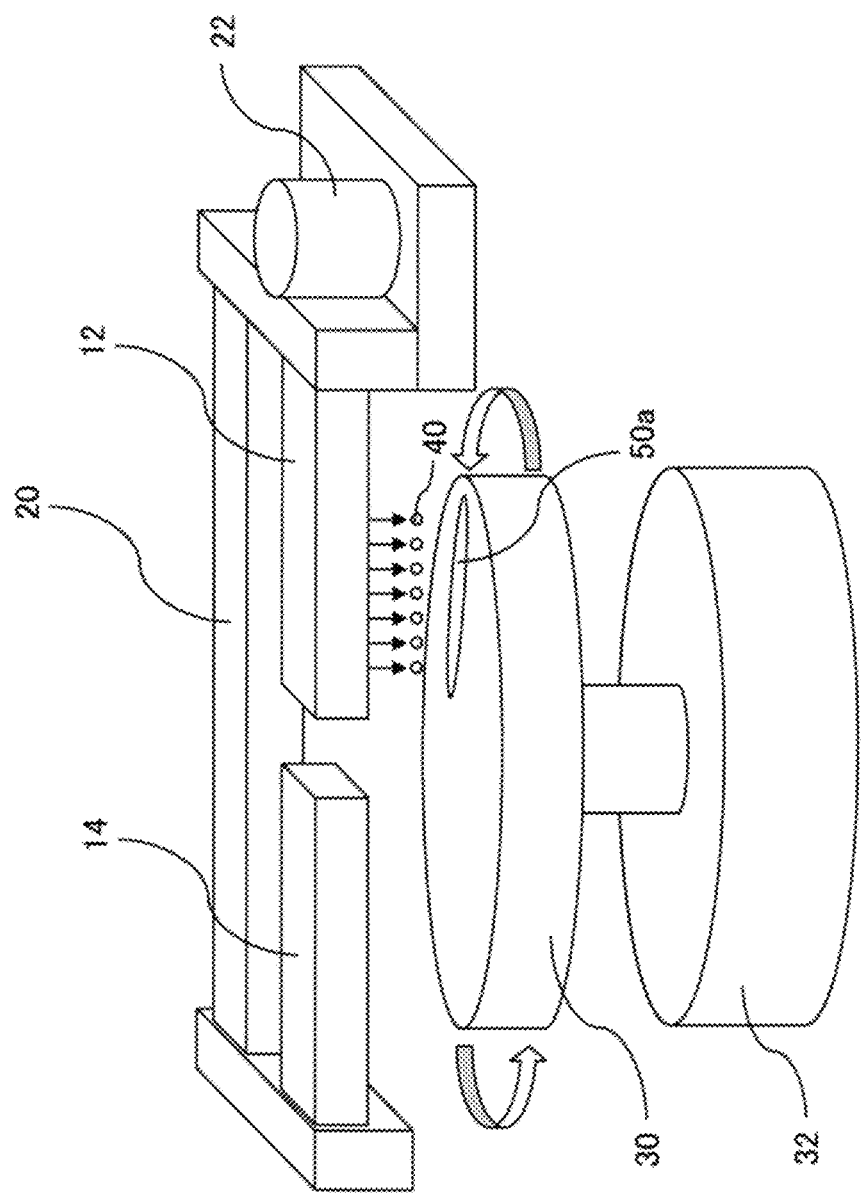

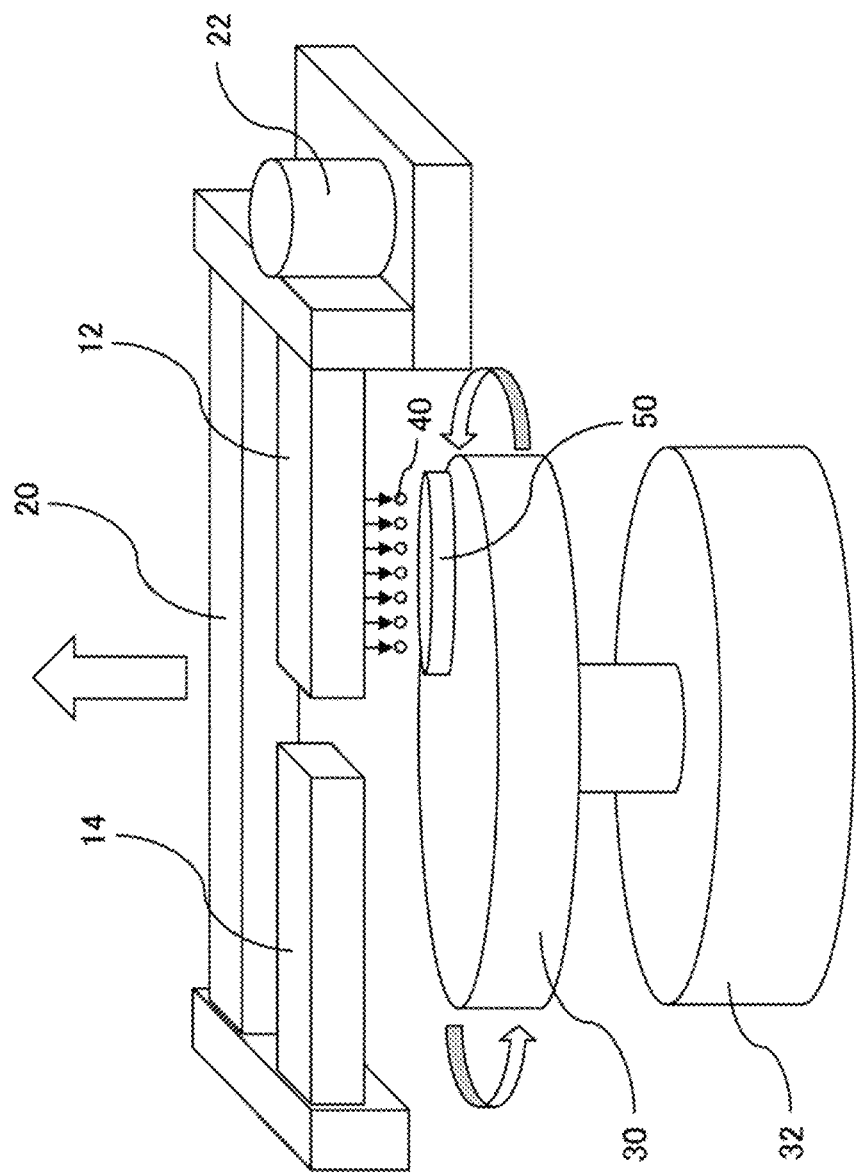

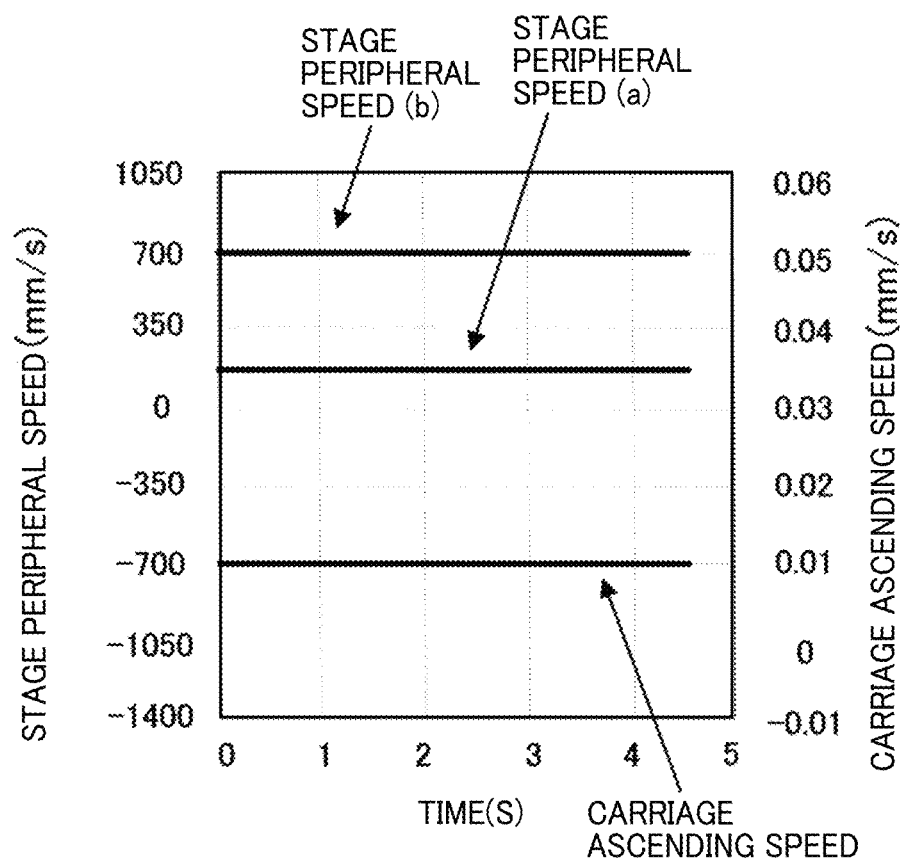

DEVICE FOR FABRICATING SOLID FREEFORM OBJECT AND METHOD OF FABRICATING SOLID FREEFORM OBJECT

CROSS-REFERENCE TO RELATED APPLICATIONS

This patent application is based on and claims priority pursuant to 35 U.S.C. § 119 to Japanese Patent Application No. 2021-019693, filed on Feb. 10, 2021, in the Japan Patent Office, the entire disclosure of which is hereby incorporated by reference herein.

BACKGROUND

Technical Field

The present disclosure relates to a device for fabricating a solid freeform object and a method of fabricating a solid freeform object.

Description of the Related Art

Methods including general additive manufacturing and material jetting are utilized to fabricate solid freeform objects.

General additive manufacturing includes stereolithography for forming cross section images by exposing uncured liquid material to laser-scanning with curing energy and powder lamination for forming cross section images by selectively discharging an inkjet binder to material powder. Since only a single type of fabrication material is used in those methods, the surface of a fabricated object is colored as an independent process after the fabrication.

The material jetting is to form a solid freeform object using a head also referred to as a discharging head, a recording head, or an inkjet head for discharging material. This method makes it possible to form a color object by discharging materials with different colors from discharging heads. The material inkjetting becomes popular because it obviates the need for coloring as an independent process.

SUMMARY

According to embodiments of the present disclosure, a device for fabricating a solid freeform object is provided which includes a stage that rotates, a discharging device disposed over the stage and includes a discharging head each having one or more nozzles, the discharging head for discharging a curing composition to the stage and an exposing device disposed over the stage that exposes the stage to active energy, wherein the distance between the stage and the discharging device is variable and the distance between the stage and the exposing device is variable, wherein the shorter direction of the discharging head is perpendicular to the direction from the center of rotation of the stage toward the peripheral of the stage, wherein the number of the nozzles along the shorter direction increases in the direction from the center of rotation of the stage toward the peripheral of the stage.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 2A is a diagram illustrating an example of discharging for description;

FIG. 2C is a diagram illustrating of an example of changing the distance for description;

FIG. 7C is a graph illustrating the peripheral speed of the stage.

Figure 1:
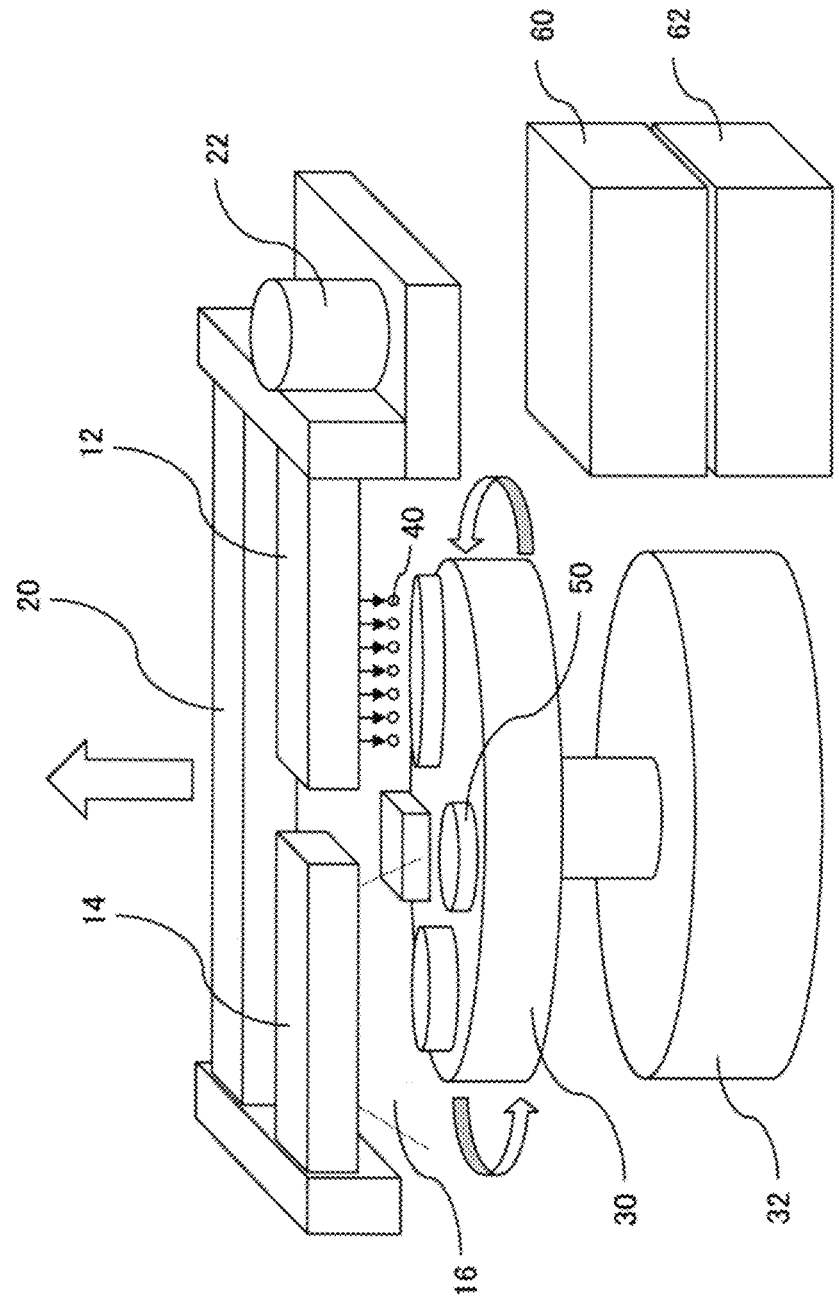
FIG. 1 is a schematic diagram illustrating a perspective view of an example of the device for fabricating a solid freeform object according to an embodiment of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

The material jetting is executed by moving a head back and forth or rotating a stage.

Moving a head back and forth is commonly used. Cross section images are formed in image printing by scanning a head back and forth to laminate layers. Since the head scans in a reciprocated manner in this method, it repeats picking up the speed, moving at a constant speed, reducing the speed, and coming to a stop. The material is mostly discharged when the head moves at a constant speed. This reciprocation thus involves wastes in action not contributing to fabrication so that the fabrication time becomes longer. The method of rotating a stage is then appealing.

In this method, a head discharges a material onto a rotating fabrication stage to form layers. Since the head can be fixed along the x-y direction and the rotation stage facing the head can be rotated at a constant speed, objects can be fabricated by continuous discharging, thereby shortening the fabrication time and reducing the drive energy. The device size can be reduced because the moving region of the drive unit is small.

The moving speed, peripheral speed, of such a stage in rotation is different along the radius of the stage. The moving speed at the region on the inner side of the stage is thus different from that on the outer side. This difference results in a smaller dot density on the outer side than the inner side when a material is discharged under the same condition. If there is a difference in the dot density between the inner side region and the outer side region, it is difficult to form an equalized solid object. Increasing the drive frequency of nozzles on the outer side region or the amount discharged to the outer side region is an option to deal with this problem. However, such an option fails to compensate the difference if the rotation speed of the stage increases.

According to the present disclosure, a device for fabricating a solid freeform object is provided which can minimize the difference in dot density between the inner side region of a stage and the outer side region of the stage to manufacture uniform fabrication objects.

Hereinafter, the device for fabricating a solid freeform object and a method of fabricating a solid freeform object are described with reference to the accompanying drawings. It is to be noted that the following embodiments are not limiting the present disclosure and any deletion, addition, modification, change, etc. can be made within a scope in which man in the art can conceive including other embodiments, and any of which is included within the scope of the present disclosure as long as the effect and feature of the present disclosure are demonstrated.

The device for fabricating a solid freeform object includes a stage that rotates, a discharging device disposed over the stage that includes one or more discharging heads each having nozzles, the one or more discharging heads that discharge one or more types of curing compositions to the stage, and an exposing device disposed over the stage that exposes the stage to active energy, wherein the distance between the stage and the discharging device is variable and the distance between the stage and the exposing device is variable, wherein the shorter direction of the discharging head is perpendicular to a direction from the center of rotation of the stage toward the peripheral of the stage, wherein the number of the nozzles along the shorter direction increases in the direction from the center of rotation of the stage toward the peripheral of the stage.

According to the present disclosure, the difference in the dot density between the inner side region and the outer side region of a stage can be reduced so that a uniform object can be fabricated. The shortage of a curing composition, also referred to as ink, present in the outer side region can be minimized.

One embodiment of the device for fabricating a solid freeform object and the method of fabricating a solid freeform object relating to the present disclosure is described below.

Before the device for fabricating a solid freeform object and the method of fabricating a solid freeform object are described, a method of moving a head back and forth and a method of rotating a stage typically used are described with reference to FIGS. 6A-6C and 7A-7C.

Figure 6A:
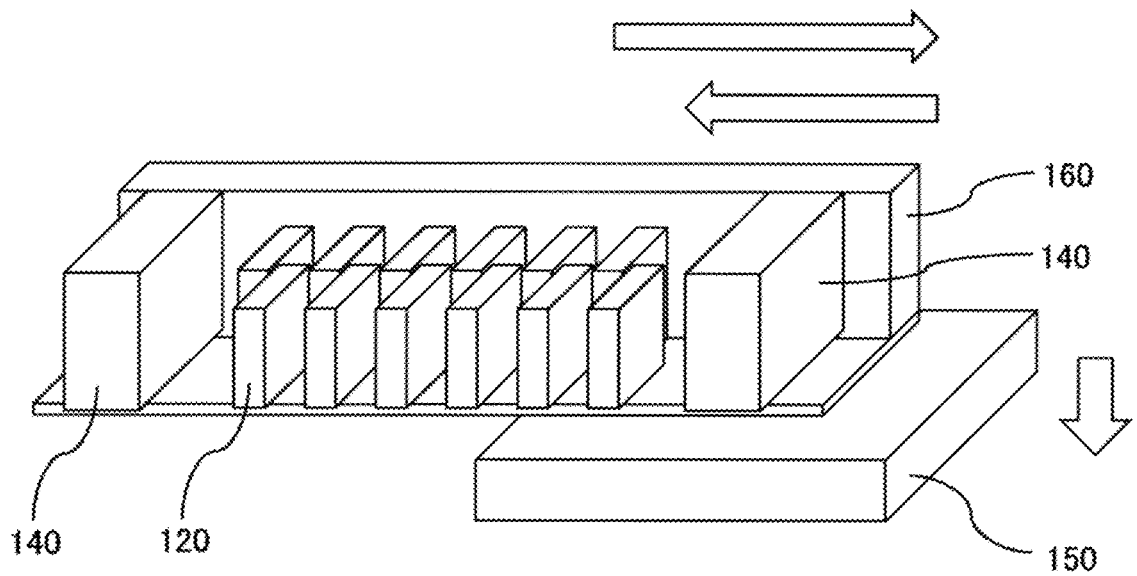
FIG. 6A is a schematic diagram illustrating a perspective view of an example of a head moving back and forth.

FIG. 6A is a schematic diagram of a perspective view illustrating a typical head moving back and forth and includes heads 120, a light source 140, an elevating stage 150, and a carriage 160. In FIG. 6A, the arrow in the shorter direction indicates the scanning direction of the carriage 160 that moves back and forth and the downward arrow indicates the moving direction of the elevating stage 150. In this method, the carriage 160 scans while it moves back and forth, the head 120 discharges ink, and the light source 140 emits active energy. While repeating discharging and emitting, the elevating stage 150 is moved downward to fabricate a laminate object.

Figure 6B:
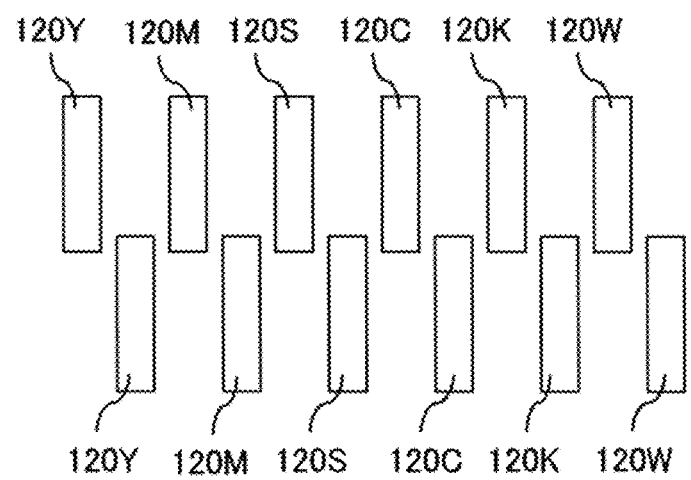
FIG. 6B is a diagram illustrating a top view of the head illustrated in FIG. 6A.

FIG. 6B is a diagram illustrating a top view of the heads 120 in FIG. 6A. The heads discharging the same color ink are generally deposited in a zigzag manner to prevent the gap appearing at the linking parts of nozzle arrays.

Figure 6C:
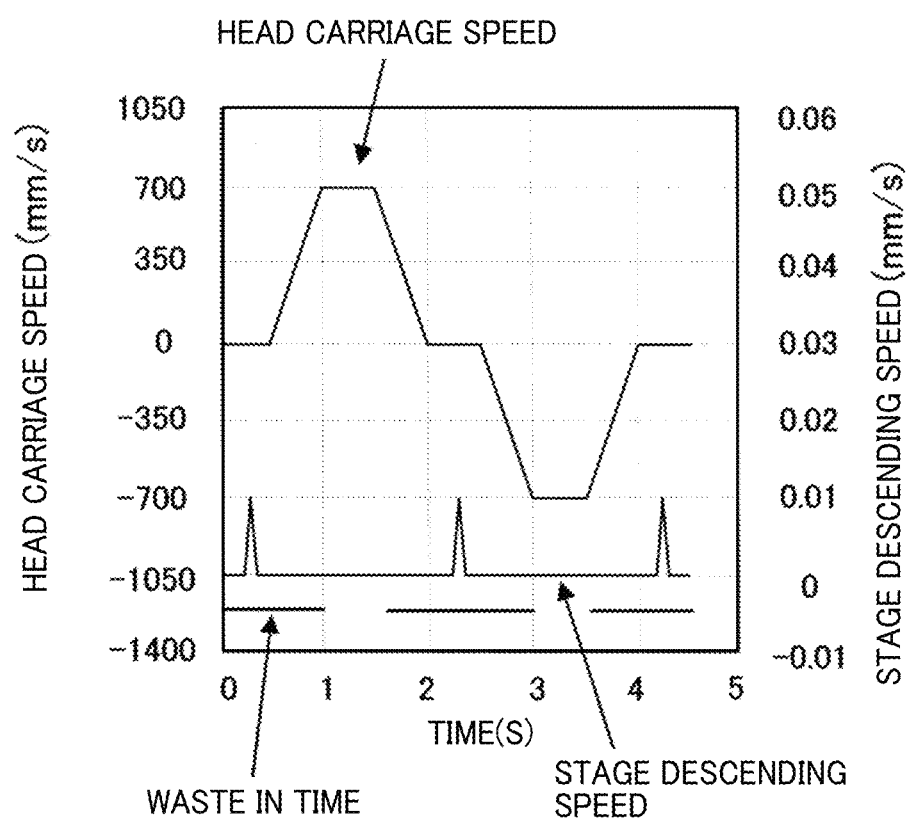
FIG. 6C is a graph illustrating the carriage speed for description.

FIG. 6C is a diagram illustrating an example of the head carriage speed, the stage descending speed, and the waste in time in FIG. 6A. The head carriage speed is as illustrated in FIG. 6C because acceleration, constant speed, reducing speed, and stop are repeated while the carriage 160 scans while moving back and forth. When the head carriage speed is at a constant speed, for example, 700 mm/s or −700 mm/s, the ink is discharged, resulting in waste in time during the state except for the constant speed. The elevating stage 150 does not continuously descend because it descends in accordance with the movement of the carriage 160. For this reason, the size of a device and the loss of energy consumption are required to be reduced in the typical way of a head moving back and forth in addition to an increase in the fabrication speed.

Figure 7A:
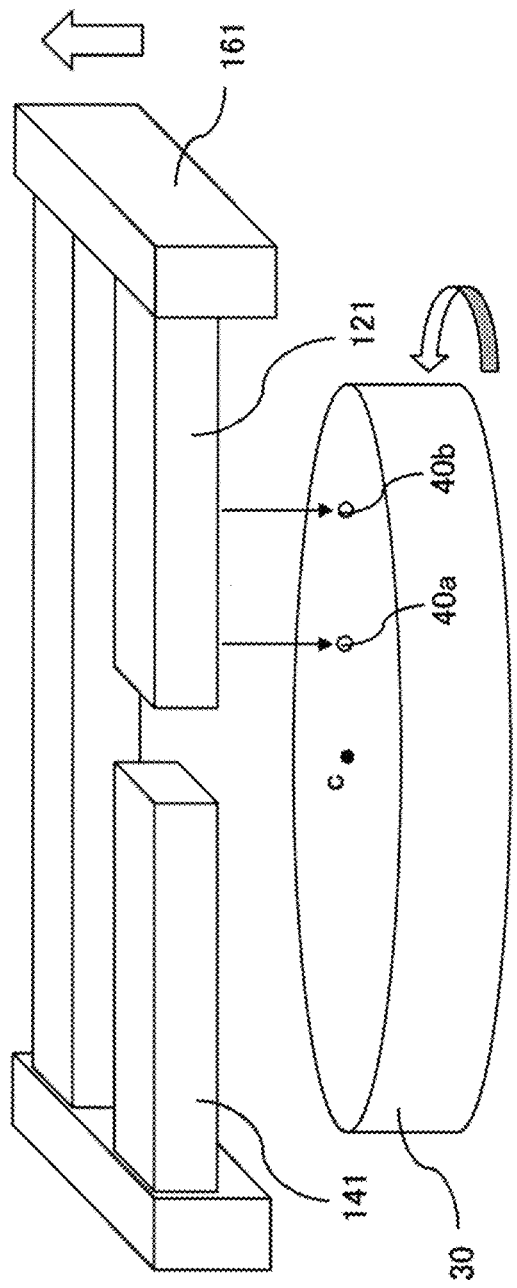
FIG. 7A is a diagram illustrating a perspective view of an example of the rotation of a stage.

FIG. 7A is a schematic diagram illustrating a perspective view of an example of the way of rotating a stage and includes a stage 30 and a head 121. The head 121 discharges ink 40a and 40b to the stage 30. The ink discharged from the stage 30 is exposed to active energy emitted from the exposing device 141. A carriage 161 carries the head 121 and the exposing device 141 which repeat discharging and emitting. The carriage 161 is moved upward to fabricate a laminate object.

Figure 7B:
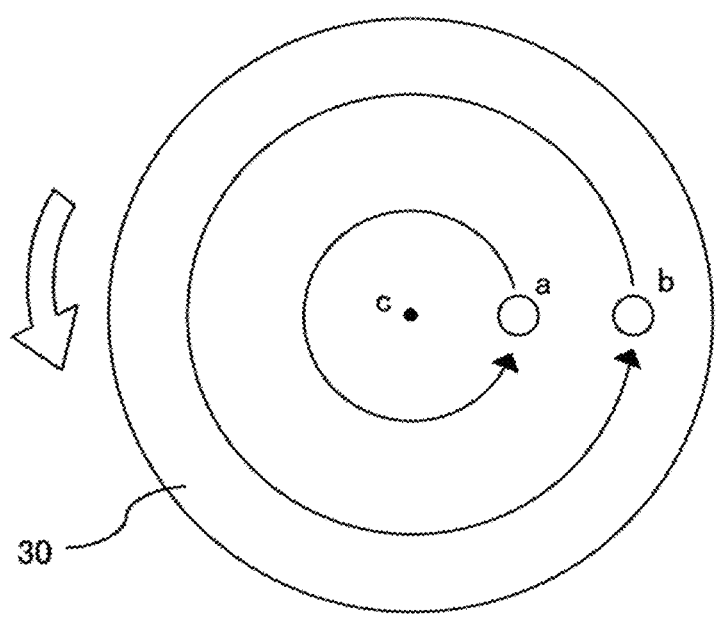
FIG. 7B is a schematic diagram of a top view illustrating the rotation.

FIG. 7B is a diagram of a top view of the stage 30 illustrated in FIG. 7A. The circulating position a on the inner side and the circulating position b on the outer side are schematically illustrated. The arrow in FIG. 6B indicates the rotation direction of the stage 30 and c represents the center of rotation of the stage 30.

FIG. 7C is a graph of an example of the stage peripheral speed, linear speed, in FIGS. 7A and 7B and the carriage ascending speed. The peripheral speed is constant so that the carriage is lifted up at a constant speed. The head 121 discharges ink at any time, thereby preventing waste in time. This method thus results in a faster fabrication speed than the method of moving a head back and forth. The size of a device can be reduced because there is no need to moving a carriage back and forth.

On the other hand, according to the method of rotating a stage, uniform fabrication is difficult because the inner side region and the outer side region of the stage 30 have different peripheral speeds. While the peripheral speed of the ink 40a spitted to the inner side region of the stage 30 is slow, the peripheral speed of the ink 40b spitted to the outer side region of the stage 30 is fast. This speed difference results in a smaller dot density on the outer side than the inner side when a material is discharged under the same condition, which causes a problem of uniform fabrication.

The device for fabricating a solid freeform object of the present embodiment is described with reference to FIGS. 1 to 3.

FIG. 1 is a schematic diagram illustrating a perspective view of the device for fabricating a solid freeform object of the present embodiment. The device for fabricating a solid freeform object of the present embodiment includes the stage 30, the discharging head 12, an exposing unit 14, and other optional devices. The reference numeral for the discharging device is omitted but it has the discharging head 12. The reference numeral of the exposing device is omitted but it has the exposing unit 14.

The device for fabricating a solid freeform object of the present embodiment can be also referred to as a laminate manufacturing device, a solid object fabricating device, an image forming device, and a 3D printer. There is no specific limit to the fabrication object. The fabrication object can be also referred to as a 3D object, a solid object, a structure, a laminate, and a cured object.

The stage 30 rotates. The rotation direction of the stage 30 is schematically indicated by the arrow in FIG. 1. The stage 30 viewed from top is a circle or another shape.

The stage 30 is rotated by a rotation drive device 32. The rotation drive device 32 rotates the stage 30. It can be configured to move the stage 30 upward or downward vertically. The rotation speed, peripheral speed, of the stage 30 can be suitably determined. Although it is not specifically limited, the speed is preferably rotated at a constant speed.

The discharging head 12 is disposed over the stage 30. The discharging head 12 has nozzles and discharges a curing composition, ink 40, to the stage 30 from the nozzles. As described later, the discharging head 12 can be multiple.

The curing composition can be suitably selected. The curing composition is also referred to as ink. The curing composition, ink, for use in the present embodiment cures by active energy emitted from the exposing device. The discharging device preferably controls discharged liquid droplets.

The ink for use in the present embodiment may contain a coloring material, a resin, a polymerizable compound, a polymerization initiator, a solvent, and a surfactant. The discharging device discharges colored ink of cyan, magenta, yellow, black, and white from discharging heads to fabricate a colored object. Ink containing a coloring material can be also referred to as a curing composition for fabrication.

Ink shrinking less during curing is preferable because it enhances the quality of a fabrication object.

As described later, it is possible to configure multiple discharging heads 12 for discharging multiple types of ink. A curing composition for support can be used to form a support. The latitude of freelance of a solid shape manufactured increases by forming a support. Supports can be removed after fabrication. Some can be removed by dissolving in water or a solvent and others can be removed by temperature change or application of energy. These can be selected to suit to a particular application.

The exposing unit 14 is disposed over the stage 30. The exposing unit 14 exposes the stage 30 to active energy 16. In other words, the ink 40 discharged to the stage 30 is irradiated with the active energy 16. As described later, the exposing unit 14 can be multiple.

The exposing unit 14 is not particularly limited as long as it can emit active energy required to cure ink. Active energy is not particularly limited as long as it is able to apply energy necessary for allowing polymerization of polymerizable components in the composition. Examples of the active energy include, but are not limited to, electron beams, a-rays, B-rays, g-rays, and X-rays, in addition to ultraviolet rays. Many of the procurable curing compositions can be used with a small ultraviolet LED light source.

In addition, in the case of irradiation of ultraviolet radiation, there is strong demand for mercury-free procedure to protect the environment. Therefore, superstition with GaN-based ultraviolet light-emitting devices is greatly preferred from industrial and environmental point of view. Furthermore, ultraviolet light-emitting diodes (UV-LED) and ultraviolet laser diodes (UV-LD) are preferable as ultraviolet light sources because they have small sizes, long working life, and high efficiency, and enjoy high cost performance.

In the case of a light source using an LED, on-off control can be readily synchronized with the position of cross section images by a control unit 60. In addition, excessive energy application is avoided, resulting in energy-saving and heat reduction because the light source can be turned off at a timing on which a solid object is not present in an exposing area during lamination.

Although it is not limiting, the discharging head 12 and the exposing unit 14 are carried by the carriage member 20 in the present embodiment. The carriage member 20 is movable up and down vertically.

In the drawings, the carriage member 20 moves upward indicated by the arrows. The carriage member 20 can be also referred to as an image forming carriage or just a carriage.

Although it is not limiting, the discharging head 12 and the exposing unit 14 are carried by the carriage member 20 in the present embodiment and are not moved along the surface direction of the stage 30.

In other words, when the surface direction of the stage 30 is determined as x-y direction, the discharging head 12 and the exposing unit 14 are referred to as fixed in the x-y direction. For this reason, each nozzle of the discharging head 12 readily discharges ink to the target position and the exposing unit 14 readily emits active energy to the target position. In this case, the discharging head 12 and the exposing unit 14 move up and down vertically in accordance with the movement of the carriage member 20.

In the present embodiment, the distance between the discharging head 12 and the stage 30 and the distance between the exposing unit 14 and the stage 30 are variable. Discharging and exposing ink is repeated to laminate ink to fabricate a solid object by vertically moving the carriage member 20 upward.

The distance between the discharging head 12 and the stage 30 is also referred to as the distance between the discharging device and the stage. As long as the discharging head 12 and the fabrication object are configured not to be in contact with each other, the wording can be suitably changed. The distance between the exposing unit 14 and the stage 30 is also referred to as the distance between the exposing device and the stage. As long as the exposing unit 14 and the fabrication object are configured not to be in contact with each other, the wording can be suitably changed.

The way of changing the distance between the discharging head 12 and the stage 30 and the distance between the exposing unit 14 and the stage 30 can be suitably changed.

For example, the distance between the discharging head 12 and the stage 30 and the distance between the exposing unit 14 and the stage 30 are increased as the number of lamination layers of a curing composition increases. This structure prevents the discharging head 12 and the exposing unit 14 from being brought into contact with a fabrication object.

The way of changing the distance between the discharging head 12 and the stage 30 and the distance between the exposing unit 14 and the stage 30 is not limited to the above-described configuration. In another example, the stage 30 can be descended. It is also possible to independently move the discharging head 12 and the exposing unit 14.

The device for fabricating a solid freeform object of the present embodiment may include the control unit 60. The control unit 60 controls the rotation drive device 32 and the peripheral speed of the stage 30. It also controls the ascending speed of the carriage member 20.

The device for fabricating a solid freeform object of the present embodiment may include a data processing unit 62. Although this is not limiting, the data processing unit 62 converts the image data of the solid shape and the surface of a solid object into the data of the cross sections of a laminate object to be fabricated with ink. The data processing unit 62 regulates the coordinate in the horizontal plane and the type and amount of ink to be discharged and accumulated by the rotation angle θ of the stage 30 and the distance r from the center of rotation. The control unit 60 controls each device based on the information.

The device for fabricating a solid freeform object of the present embodiment may include an ink tank 22. The ink tank 22 stores ink and supplies it to the discharging device. The amount of ink stored in the ink tank 22 can be suitably selected for fabrication.

The device for fabricating a solid freeform object of the present embodiment is described with reference to the method of fabricating a solid freeform object of the present embodiment.

The method of fabricating a solid freeform object of the present embodiment is executed with the device for fabricating a solid freeform object of the present embodiment includes discharging one or more types of curing compositions with the discharging device, exposing the one or more types of curing compositions to active energy with the exposing device, and changing the distance between the stage and the discharging device and the distance between the stage and the exposing device.

Figure 2B:
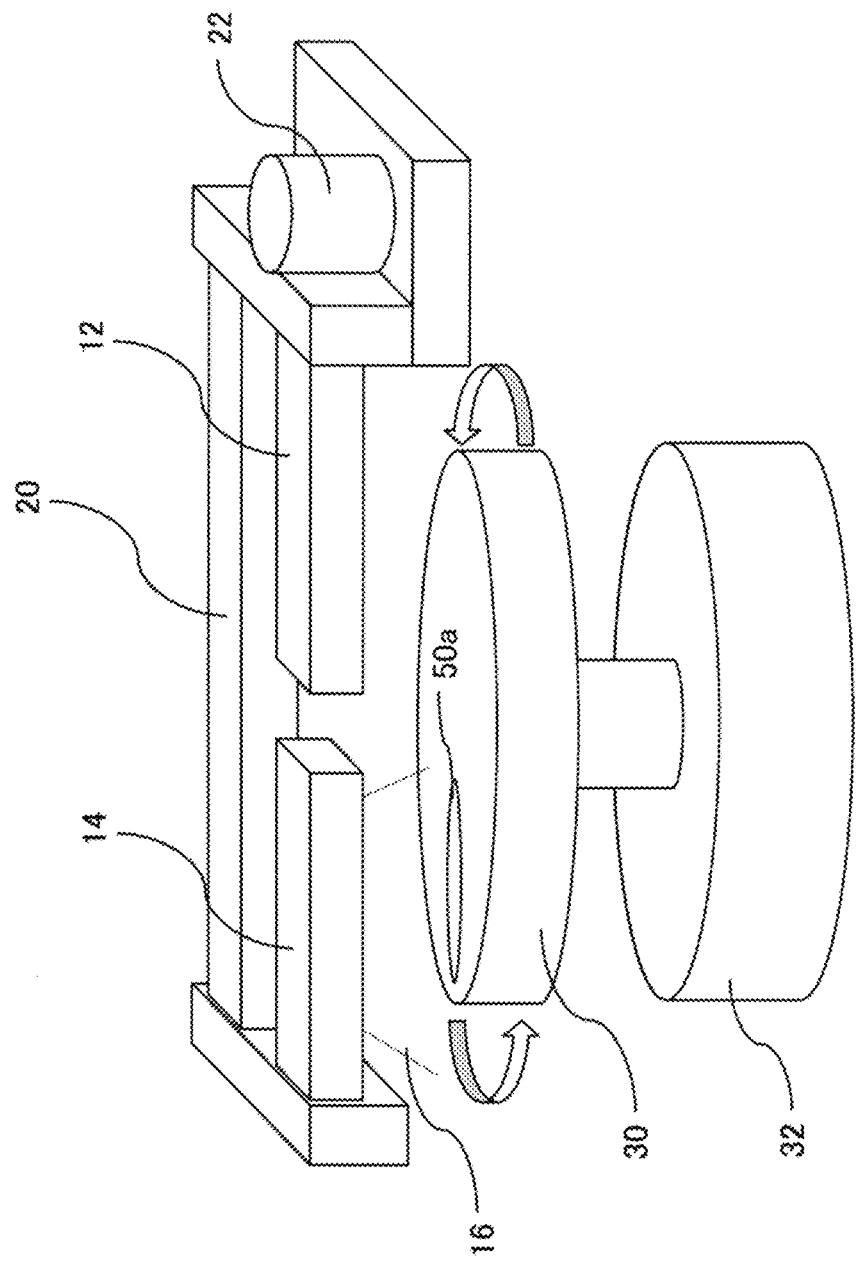
FIG. 2B is a diagram illustrating an example of exposing for description.

The method of fabricating a solid freeform object of the present embodiment is described with reference to FIGS. 2A-2C. FIG. 2A is a diagram illustrating an example of the discharging, FIG. 2B is a diagram illustrating an example of exposing, and FIG. 2C is a diagram illustrating an example of distance-changing. In the following embodiment, the discharging, the exposing, and the distance-changing are described below. The sequence of these processes is not limited thereto. These processes can be executed at the same time.

As illustrated in FIG. 2A, the discharging head 12 discharges the ink 40 to the stage 30 in the discharging. The ink 40 discharged to the stage 30 is represented by 50a. The discharging can be referred to as depositing.

The data processing unit 62 converts the information of a 3D structure to the information of laminate cross sections and regulates the coordinate in the horizontal plane and the type and amount of ink to be discharged and accumulated by the rotation angle θ of the stage 30 and the distance r from the center of the rotation. This information is converted into the drive information of the discharging head 12. The control unit 60 controls the discharging head 12, whether the ink has discharged, and the amount of the ink based on this drive information. The discharging head 12 discharges ink from corresponding nozzles on the corresponding timing to the discharging coordinate on the stage in rotation.

The control unit 60 controls driving the rotation of the stage 30, driving ink discharging of the discharging head 12, and driving elevating the carriage member 20. Ink can be discharged and accumulated with more accuracy corresponding to the laminate cross section information according to such controlling. "Accumulate" can be represented by land, deposit, cure, and laminate.

As illustrated in FIG. 2B, the exposing unit 14 exposes the ink to the active energy 16 in the exposing. The ink 40 absorbs the energy required to cure during the exposing, thereby forming a cured cross section layer. The exposing can be referred to as curing.

When to expose to the active energy can be suitably changed. For example, the ink 40 discharged from the discharging head 12 passes under the exposing unit 14 before the stage 30 rotates one round. The ink 40 is exposed to the active energy when passing under the exposing unit 14.

As illustrated in FIG. 2C, the distance between the discharging head 12 and the stage 30 and the distance between the exposing unit 14 and the stage 30 are changed in the distance-changing. The distances can be changed by moving the carriage member 20. They increase by elevating the carriage member 20. For example, the distances can be increased based on the number of laminated layers of a fabrication object.

For example, the carriage member 20 is elevated in the amount corresponding to a cross section layer while the stage 30 rotates one round. As another example, the carriage member 20 is elevated in the amount corresponding to a cross section layer when the stage 30 comes to the home position after one round. Alternatively, the carriage member 20 is elevated in the amount corresponding to a cross section layer at a constant speed for the time taken for the stage 30 rotating one round. The distances can be continuously or incessantly changed.

Although this is not limiting, it is preferable to keep the distance between the discharging head 12 and the stage 30. Keeping the same distance results in more uniform solid object. Although this is not limiting, it is preferable to keep the distance between the exposing unit 14 and the stage 30.

The distances are preferably changed by the control unit 60 in synchronization, association, or control with the discharging from the discharging head 12 and the rotation of the stage 30. It is also preferable to increase the distance between the discharging head 12 and the stage 30 while measuring the thickness of the laminate object, the solid object.

The distances can be changed by moving the carriage member 20 or descending the stage 30. These can be selected to suit to a particular application.

The discharging head 12 for use in the present embodiment is described in detail with reference to FIG. 3. FIG. 3 is a diagram illustrating another example of the discharging head for use in the present embodiment and also a schematic diagram illustrating the discharging head 12 in FIG. 1 viewed from the stage 30.

Figure 3:
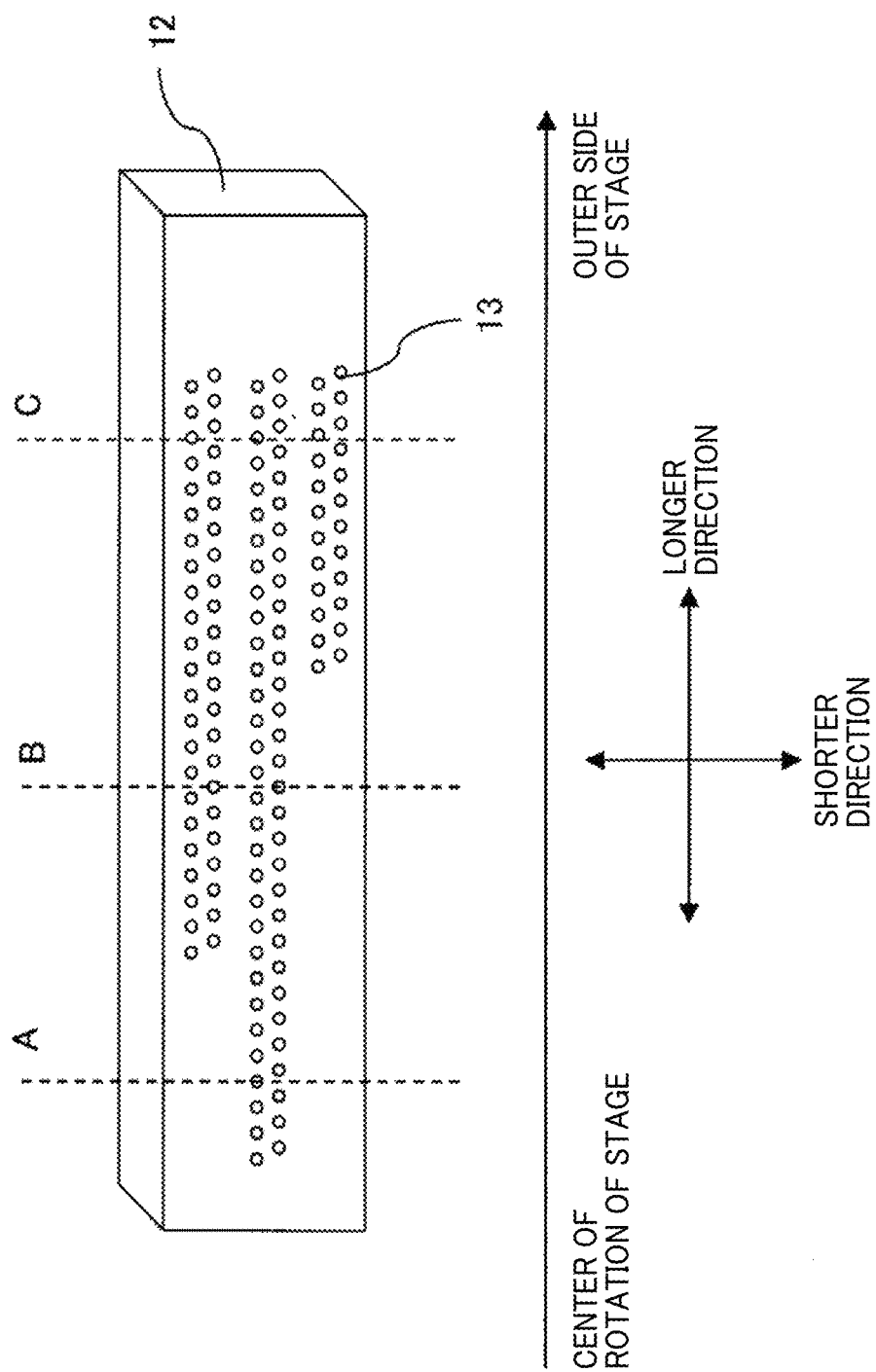
FIG. 3 is a schematic diagram illustrating an example of a head.

In FIG. 3, the one-directional arrow indicates the direction from the center of rotation of the stage 30 toward the peripheral of the stage 30 and the bidirectional arrows indicate the longitudinal direction (longer direction) and the latitudinal direction (shorter direction) of the discharging head 12. As illustrated in the drawing, the discharging head 12 has a shorter portion in the direction perpendicular to the direction from the center of rotation toward the peripheral of the stage 30. In other words, the discharging head 12 has a longer direction from the center of rotation toward the peripheral of the stage 30 and a shorter direction perpendicular to the longer direction.

As illustrated in FIG. 3, the discharging head 12 in the present embodiment includes nozzles 13 that discharge curing compositions. Although this is not limiting, the nozzles 13 are disposed along the direction from the center of rotation to the peripheral of the stage 30. The plane on which the nozzles 13 are disposed is also referred to as the nozzle surface.

The discharging head 12 of the present embodiment has more nozzles along the shorter direction on the outer side region of the stage 30 than those along the shorter direction on the inner side region of the stage 30. This is described with reference to the dotted lines A, B, and C in FIG. 3. The dotted line A represents an example of the line segment along the shorter direction on the inner side region of the stage 30. The dotted line B represents an example of the line segment along the shorter direction on the outer side region of the stage 30 in comparison with the line segment A. As illustrated in FIG. 3, the number of nozzles along the dotted line B is more than the number of nozzles along the dotted line A.

The dotted line C represents an example of the line segment along the shorter direction on the outer region of the stage 30 in comparison with the dotted lines A and B. The number of nozzles along the dotted line C is more than the number of nozzles along the dotted lines A and B.

As described above, the number of nozzles of the discharging head 12 along the shorter direction increases from the center of rotation toward the peripheral of the stage 30 in the present embodiment. This configuration can prevent the dot density from decreasing in the outer side region where the peripheral speed is faster, thereby fabricating uniform solid objects.

The number of nozzles can be increased in a suitable range as long as it achieves the effect of the present disclosure. It is not limited to three dotted regions illustrated in FIG. 3. At least two dotted regions are necessary. For example, a case of just the regions of the dotted line A and the dotted line B is allowed. At least one region where the number of nozzles along the shorter direction on the outer side region of the stage 30 is more than that along the shorter direction on the inner side region of the stage 30 is required. It is preferable to have a larger number of regions having nozzles along the shorter direction to fabricate more uniform solid freeform objects.

According to the device for fabricating a solid freeform object of the present embodiment, the difference in the dot density between the inner side region and the outer side region of a stage can be reduced so that uniform objects can be fabricated. Since the method of rotating a stage is employed in this embodiment, the change in acceleration of a movable part is reduced, resulting in minimizing the waste in time and energy which a typical method of a head carriage moving back and forth suffers. Solid objects can be fabricated quickly in the present embodiment, enhancing the productivity. Rotating a stage at a constant speed leads to improvement on the discharging accuracy. The difference in the dot density between the inner side region and the outer side region of a stage is reduced even at fabrication at a faster speed, which can prevent coarse dot density. The device can be smaller because the carriage does not move outside the fabrication region unlike the method of moving a carriage back and forth.

The number of nozzles in the discharging head 12 along the shorter direction increases step by step in the order of the dotted line A, the dotted line B, and the dotted line C in the case illustrated in FIG. 3. The number of nozzles of the discharging head 12 along the shorter direction increases from the center of rotation of the stage 30 toward the peripheral of the stage 30 in a step-by-step manner. In this example, the number of nozzles readily increases in such a configuration. This configuration does not limit the present embodiment. The number of nozzles can be increased in a continuous manner.

Another embodiment of the device for fabricating a solid freeform object of the present disclosure is described below.

The device for fabricating a solid freeform object is described with reference to FIG. 4. The device for fabricating a solid freeform object of the present embodiment includes multiple discharging heads. The device for fabricating a solid freeform object of the present embodiment includes multiple exposing devices.

In the examples below, the device includes multiple discharging heads and multiple exposing units at the same time, but is not limiting the percent embodiment. The combination of multiple discharging head and an exposing device and the other way around are allowed.

Figure 4:
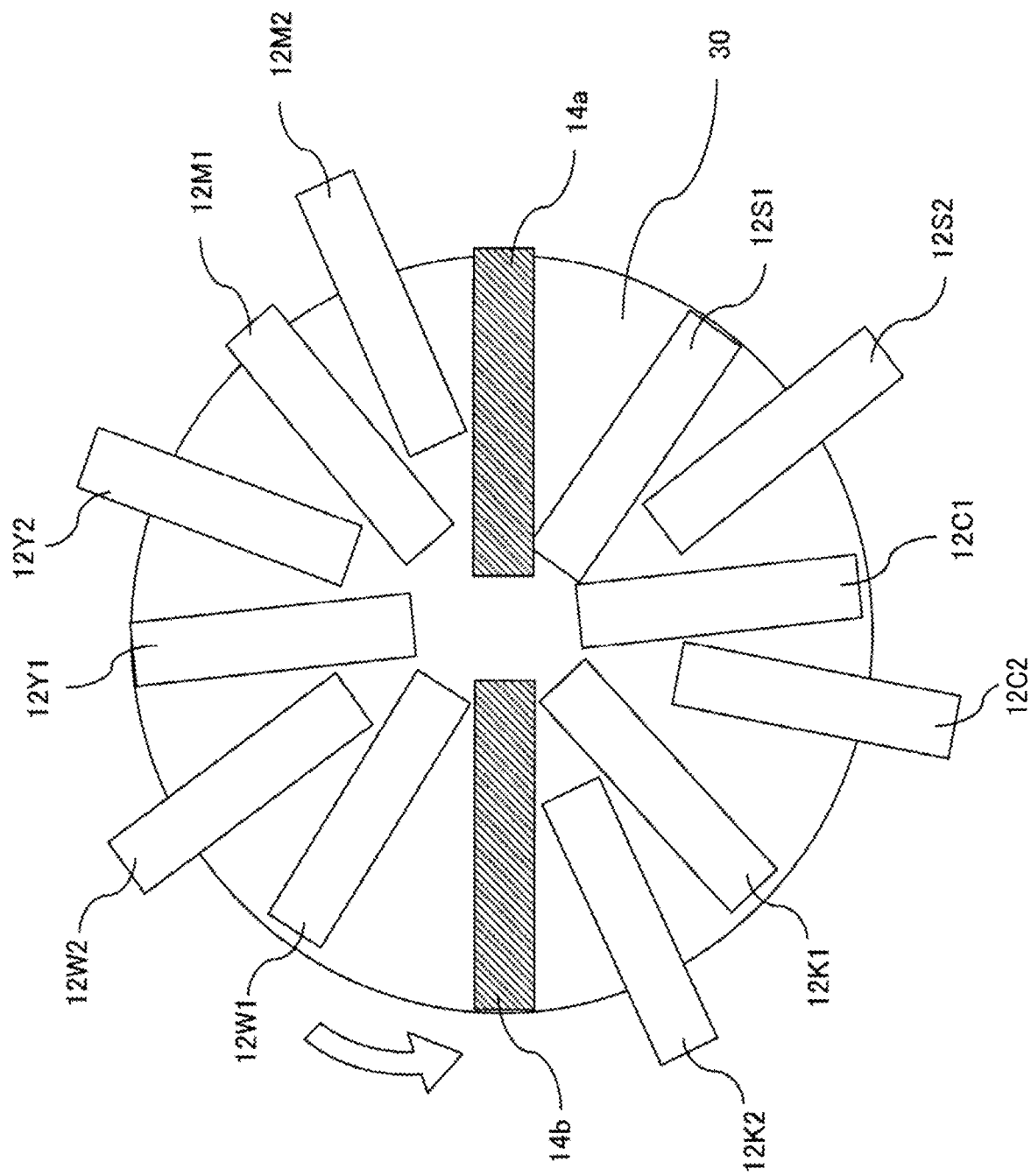
FIG. 4 is a schematic diagram illustrating an example of a discharging device and an exposing device.

FIG. 4 is a schematic diagram illustrating a top view of the device for fabricating a solid freeform object of the present embodiment for description of the discharging head and the exposing device. In this example, the discharging heads include a discharging head 12Y for yellow, discharging head 12M for magenta, discharging head 12S for support, discharging head 12C for cyan, discharging head 12K for black, and discharging head 12W for white. The present embodiment is not particularly limited and can be changed suitably to suit to a particular application.

As described above with reference to FIG. 3, the number of nozzles of each discharging head 12 along the shorter direction increases from the center of rotation toward the peripheral of the stage 30. This configuration can prevent the dot density from decreasing in the outer side region where the peripheral or circumferential speed is faster so that uniform solid objects can be fabricated.

In this example, the same type of ink is configured to be discharged from two discharging heads. For the yellow ink, the discharging head 12Y1 and the discharging head 12Y2 are used. The discharging head 12Y1 is disposed at the inner side of the stage 30 and the discharging head 12Y2 is disposed at the outer side of the stage 30. "1" is assigned to the reference numeral of the discharging head disposed on the inner side of the stage 30 and "2" is assigned to the reference numeral of the discharging head disposed on the outer side of the stage 30.

It is preferable that two discharging heads like the discharging heads 12Y1 and the discharging heads 12Y2 discharging the same type of ink be deposited in different positions in the direction from the center of rotation toward the peripheral of a stage. This configuration further reduces the difference in dot density, thereby fabricating more uniform solid freeform objects.

The discharging device preferably discharges multiple types of curing compositions from multiple discharging heads and each type of the multiple types of the curing compositions is discharged from two or more of the multiple discharging heads. The two or more discharging heads discharging the same type of ink are preferably deposited in different positions in the direction from the center of rotation towards the peripheral of a stage. In other words, the distances between the discharging heads and the center of rotation of a stage are different.

"1" is assigned to the reference numerals to the other discharging heads disposed on the inner side of the stage 30 and "2" is assigned to the reference numerals to the discharging heads disposed on the outer side of the stage 30.

In this embodiment, the exposing device includes multiple exposing units and preferably includes at least one pair of exposing units facing each other on a line segment passing through the center of rotation of a stage. Like this example, a pair of an exposing unit 14a and an exposing unit 14b are deposited disposed facing each other on a line segment passing through the center of rotation of the stage 30. In this configuration, ink discharged can cure at a half cycle, a half round, of the stage. In comparison with the case of a single exposing unit, the time taken from discharging to curing of ink can be halved, meaning that color mixing and blurring of inks having different colors are effectively minimized.

A configuration having three or more exposing units 14 is also allowed. When the number of exposing units is greater than two, these can be deposited at positions at angles obtained by dividing 360 degrees by the number of exposing units 14, which is not limiting.

In this example, the discharging device includes a discharging head for discharging a curing composition for fabrication and a discharging head for discharging a curing composition for support. A device having such a configuration can fabricate a solid object having a support member so that complicated solid objects can be fabricated.

In this example, the discharging head for discharging a curing composition for fabrication includes the discharging head 12Y1 and others and the discharging head for discharging a curing composition for support includes the discharging head 12S1 and the discharging head 12S2.

The curing composition for fabrication can be suitably selected and, for example, includes those for yellow, magenta, cyan, and other colors.

The curing composition for support can be suitably selected as long as it can be removed after completion of fabrication of a solid object.

As described above, the configuration of the multiple discharging heads 12 can be freely changed. The discharging head 12S for discharging a curing composition for support can be used or dispensed. The color can be freely changed. For example, black can be represented by other colors instead of using black. It is also possible to use a single-color ink instead of color. Multiple discharging heads 12 may be configured to discharge a single type of ink.

Another embodiment of the device for fabricating a solid freeform object of the present disclosure is described below.

The device for fabricating a solid freeform object is described with reference to FIGS. 5A-5B. The device for fabricating a solid freeform object of the present embodiment includes multiple discharging heads. The device for fabricating a solid freeform object of the present embodiment includes multiple exposing devices.

In this embodiment, like the embodiment described above, the same type of curing composition such as ink is discharged from multiple discharging heads. In the case of magenta, the discharging head disposed on the inner side of the stage 30 is determined as the discharging head 12M1 and the discharging head disposed on the outer side of the stage 30 is determined as the discharging head 12M2. In this example, a discharging head 12Ma is disposed on the outer side of the stage 30.

Figure 5A:
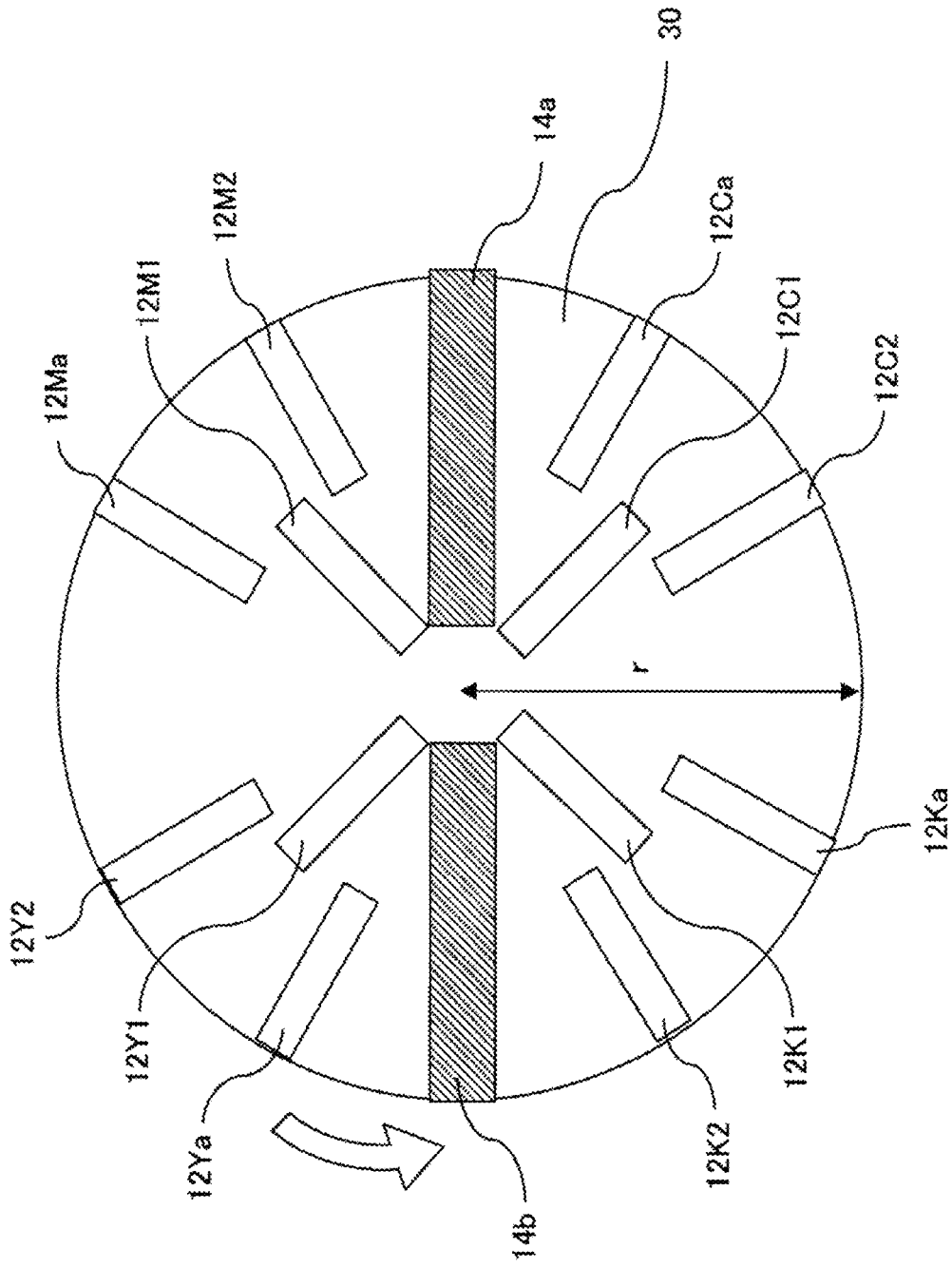
FIG. 5A is a schematic diagram illustrating another example of a discharging device and an exposing device.

FIG. 5A is a schematic diagram illustrating a top view of the device for fabricating a solid freeform object of the present embodiment. FIG. 5B is schematic diagram illustrating the discharging head of the present embodiment viewed from the stage 30. In this drawing, it is a discharging head for discharging a curing composition of magenta.

In this embodiment, the lengths L1 and L2 of the arrangements of the nozzles 13 along the longer directions of the discharging head 12M1 and the discharging head 12M2 are smaller than the radius r of the stage 30. The fabrication region can be enlarged by using multiple discharging heads for discharging the same type of ink and can be set in the region close to the radius r of the stage 30.

It is preferable to use discharging heads having the same nozzle arrangement in the case where they discharge the same type of ink. Such a configuration can obviate the need for providing a discharging head. The discharging head 12M1 and the discharging head 12M2 may have different nozzle arrangements. However, it may increase the cost of preparing such discharging heads and take time to determine the nozzle arrangement.

Figure 5B:
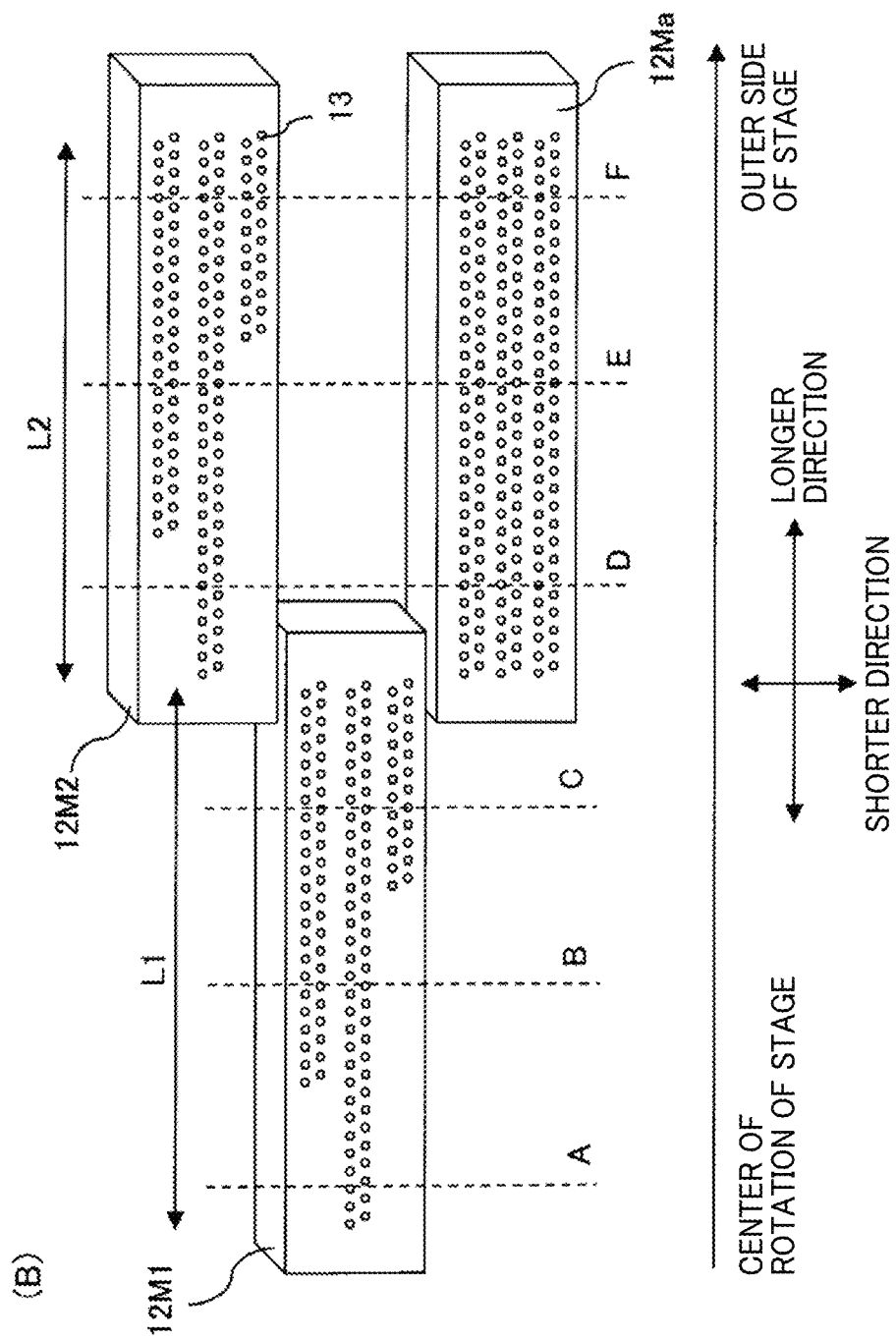
FIG. 5B is a diagram illustrating a discharging head of the discharging device.

In the example of the present embodiment, the discharging head 12M1 and the discharging head 12M2 have the same nozzle arrangement as illustrated in FIG. 5B. The same discharging head 12 as the example illustrated in FIG. 3 is used. In FIG. 5B, the length L1 of the arrangement of the nozzle 13 in the discharging head 12M1 and the length L2 of the arrangement of the nozzle 13 in the discharging head 12M2 are represented by the different symbols. These can be the same.

If the discharging heads such as the discharging head 12M1 and the discharging head 12M2 are used, the number of nozzles along the shorter direction in the discharging head 12 may be smaller than that on the inner side region of the stage 30. In FIG. 5B, while the number of nozzle lines is six in the shorter direction at the dotted line C in the discharging head 12M1, the number of nozzle lines in the shorter direction at the dotted line D is two. The number of nozzles is thus less than that on the inner side region of the stage 30. As described above, as long as at least one portion is present where the number of nozzles along the shorter direction on the outer side region of the stage 30 is more than that along the shorter direction on the inner side region of the stage 30, the effect of the present disclosure is achieved even the portion such as the dotted line D is present. However, it is preferable that portions such as the dotted line D be never or less present in order to fabricate more uniform solid objects. Since the number of nozzle lines along the shorter direction is four at the dotted line E in the discharging head 12M2, it is smaller than the number of nozzles at the dotted line C.

In the example of the present embodiment, the discharging head 12Ma is disposed on the outer side of the stage 30. The discharging head 12Ma has nozzles all over the region or lines of the nozzle surface as illustrated in FIG. 5B. In this example, the number of lines is six. This nozzle arrangement is also referred to as all region and all lines. Using the discharging head 12Ma of all region and all lines on the outer side region of the stage 30 increases the number of nozzles at the dotted line D or E than that at the dotted line C, thereby obtaining a more uniform object.

In the example illustrated in FIG. 5B, the nozzle lines (or number of nozzles) along the shorter direction are changed from two lines at dotted line A, four lines at dotted line B, six lines at dotted line C, eight lines at dotted line D, ten lines at dotted line E, and twelve lines at dotted line F. The number of nozzles along the shorter direction and the number of nozzle lines along the shorter direction have the same meaning. By using the discharging head 12Ma of all region and all lines on the outer side region of the stage 30, the number of nozzles along the shorter direction increases from the center of rotation of the stage 30 toward the outer region of the stage 30 and none of the regions has a smaller number of nozzles than the number of nozzles on the inner side region. More uniform objects can be thus obtained.

Although only magenta is used in the description above, other curing composition can be used in the same manner as magenta.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A device for fabricating a solid freeform object comprising:
   a stage configured to rotate;
   a discharging device disposed over the stage, comprising a discharging head having one or more nozzles, the discharging head configured to discharge a curing composition to the stage; and
   an exposing device disposed over the stage and configured to expose the stage to active energy,
   wherein a distance between the stage and the discharging device is variable,
   wherein a distance between the stage and the exposing device is variable,
   wherein the discharging head has a length in a longer direction that is along a direction from a center of rotation of the stage toward a peripheral of the stage, and a shorter direction of the discharging head is perpendicular to the longer direction,
   wherein a number of the nozzles along the shorter direction increases in the longer direction.

2. The device according to claim 1,
   wherein the number of the nozzles along the shorter direction increases in the direction from the center of rotation of the stage toward the peripheral of the stage in a step-by-step manner.

3. The device according to claim 1, wherein the distance between the stage and the discharging device and the distance between the stage and the exposing device increase as a number of layers of the curing composition increases.

4. The device according to claim 1, further comprising a carriage carrying the discharging head and the exposing device and vertically movable up and down.

5. The device according to claim 1, wherein the discharging head includes multiple discharging heads.

6. The device according to claim 5,
   wherein the curing composition includes multiple types of curing compositions,
   wherein the multiple discharging heads discharge the multiple types of curing compositions, each type of the multiple types of curing compositions is discharged from two or more of the multiple discharging heads,
   wherein the two or more of the multiple discharging heads are disposed in different positions from each other in the direction from the center of rotation of the stage toward the peripheral of the stage.

7. The device according to claim 1,
   wherein the exposing device comprises multiple exposing units at least one pair of which are disposed along a line segment passing through the center of rotation of the stage.

8. The device according to claim 5, wherein one or more of the multiple discharging heads discharges a curing composition for fabrication and a rest of multiple discharging heads discharges a curing composition for support.

9. A method of fabricating a solid freeform object with the device of claim 1 comprising:
   discharging the curing composition with the discharging device;
   exposing the curing composition to active energy with the exposing device; and
   changing the distance between the stage and the discharging device and the distance between the stage and the exposing device.

* * * * *